: 2,955,158
Patented Oct. 4, 1960

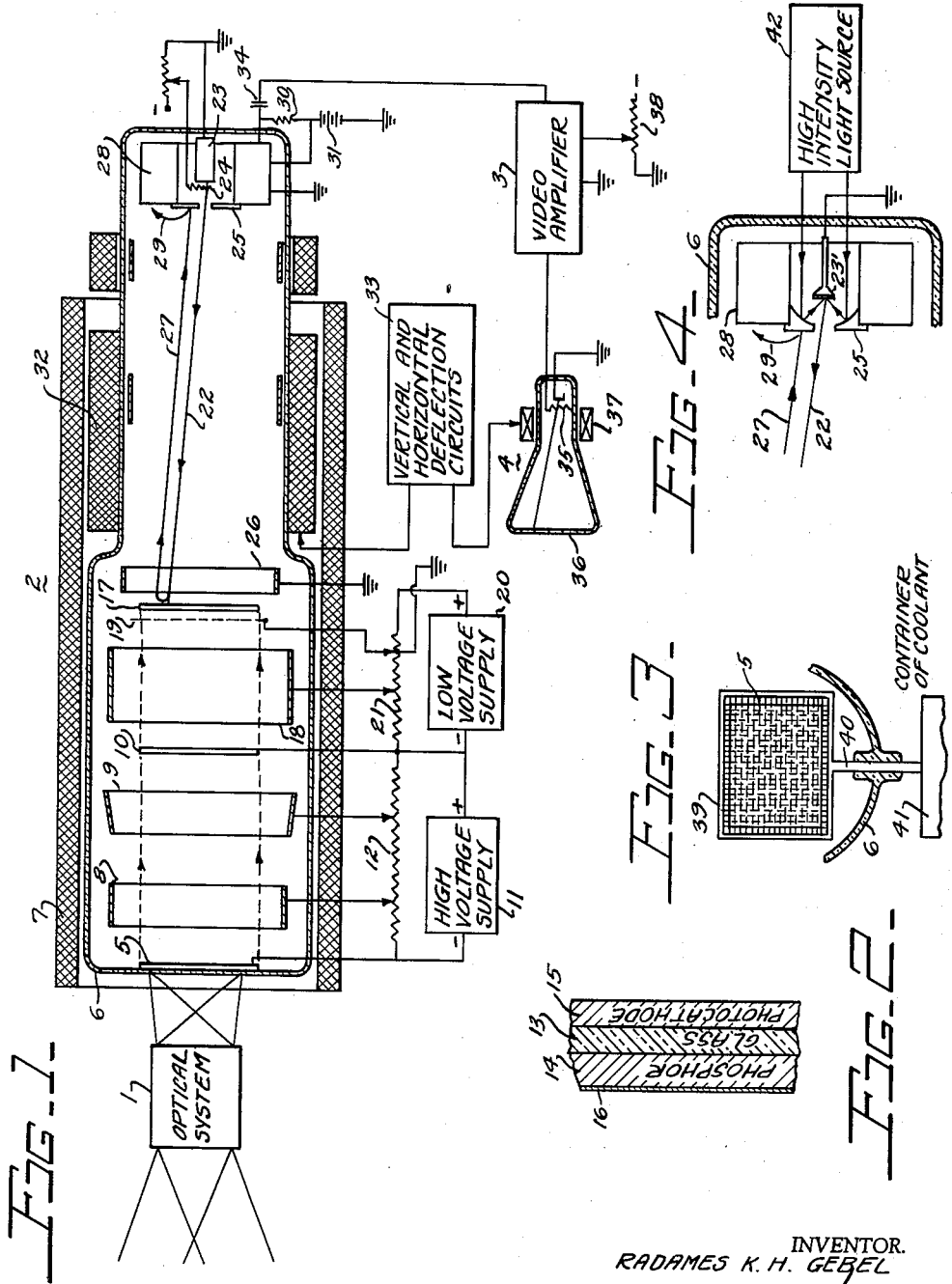

2,955,158
LIGHT AMPLIFIER

Radames K. H. Gebel, Dayton, Ohio, assignor to the United States of America as represented by the Secretary of the Air Force Filed Nov. 26, 1958, Ser. No. 776,659

2 Claims. (Cl. 178—6.8)

(Granted under Title 35, U.S. Code (1952), sec. 266)

The invention described herein may be manufactured and used by or for the United States Government for governmental purposes without payment to me of any royalty thereon.

The purpose of this invention is to provide apparatus for receiving the optical image of a scene of extremely low luminance or brightness and for reproducing this image with a brightness many times greater than that of the original scene. Since the time required for the brain to digest the information in a scene depends upon the contrast as well as the brightness of the scene, it is also a purpose of the invention to provide means for increasing the contrast in the reproduced scene. The apparatus may be used, for example, to extend the capability of the eye to see in the dark, or to reduce the exposure time required for photography under low light level conditions. The device is particularly useful for military observations and photography at night and also for astronomical observations and photography.

When used as a visual aid it is desirable that the scene be reproduced with a brightness of from 10 to 50 footlamberts to permit viewing under environmental light conditions ranging from a dimly lighted room to full daylight. The threshold of useful vision occurs at a scene brightness of between $10^{-3}$ and $10^{-2}$ footlamberts, the brightness at which the cones which make up the small area of acute vision in the retina known as the fovea centralis become effective. Under the darkest night conditions with low object reflectance, scene brightnesses as low as $10^{-8}$ footlamberts may be encountered. In order to raise the brightness of scenes ranging from $10^{-2}$ footlamberts down to $10^{-8}$ footlamberts to a level of 10 to 50 footlamberts, amplifications ranging from $10^3$ to $10^9$ and beyond are required. It is a specific purpose of the invention to provide apparatus capable of light amplifications of this magnitude.

Briefly, the light amplifier in accordance with the invention comprises an optical system of large aperture for gathering the maximum number of light quanta from the field of view; a pickup tube employing a scanning operation for converting the optical image into a video signal of good signal-to-noise ratio; a variable high gain video amplifier for amplifying the video signal and controlling the contrast of the reproduced image; and a cathode ray tube reproducer for converting the video signal into a visual image. The pickup tube employed is similar to the image orthicon television camera tube but with one or more intensifier stages located between the photocathode and the target plate. The intensifier stage or stages operate in effect to remove the limitation or sensitivity of the image orthicon tube due to fluctuations in the scanning beam and to transfer the limitation to that due to the fluctuations in the dark current of the photocathode which can be reduced to extremely low levels.

A more detailed description of the invention will be given with reference to the specific embodiment thereof shown in the accompanying drawings in which Fig. 1 is a schematic drawing illustrating the construction of a light amplifier in accordance with the invention, and Fig. 2 is an enlarged cross-section of the electron image intensifier used in Fig. 1, Fig. 3 illustrates a method of cooling the photocathode, and Fig. 4 illustrates the use of a photo cathode as the scanning beam source.

Referring to Fig. 1, the light amplifier comprises an optical system 1, a pickup tube generally indicated by numeral 2, a video amplifier 3 and a cathode ray tube reproducer 4.

The purpose of the optical system is to form an image of the field of view on the photocathode 5 of the image converter. The optical system may be a lens system or mirror system with correcting lens of the Schmidt type and should have a large aperture in order to collect as much light quanta as possible. In astronomical use the optical system would be a telescope.

The pickup tube operates to convert the image formed on its photo-cathode by the optical system into a video signal of high signal-to-noise ratio. The elements of the pickup tube are contained within an evacuated glass envelope 6 which is surrounded by a focusing coil 7 that produces an axial magnetic field within the tube. The photocathode 5, which may be composed of a mixture of cesium and antimony or other suitable high efficiency photoemissive materials may be deposited directly on the inner surface of tube 6 at one end. The optical image formed on one side of the photocathode 5 by optical system 1 causes electrons to be emitted from the other side of the photocathode. Accelerating electrodes 8 and 9 and intensifier element 10, to be described later, are maintained at increasingly greater positive potentials relative to the photocathode by means of high voltage supply 11 and potential divider 12. Electrons emitted by the photocathode are therefore accelerated toward the intensifier element 10 and also are constrained to travel in straight lines parallel to the axis of the tube by the axial magnetic field produced by focusing coil 7. The density of the electron flow over the cross section of the stream of electrons emitted by the photocathode varies in conformity with the variation in light intensity over the optical image on the photocathode, or, in other words, there is an electron image formed within the tube that corresponds to the optical image on the photocathode.

The purpose of element 10 is to intensify the electron image. A cross section of this element, greatly exaggerated in thickness, is shown in Fig. 2. The element consists of a thin glass substrate 13 coated on the electron receiving side with a suitable phosphor 14 such as cadmium sulphide and coated on the electron emitting side with a suitable photoemissive substance 15 which may be the same material used for photocathode 5. Preferably, the phosphor 14 has a thin electron pervious coating 16 of aluminum to direct the maximum amount of light generated in the phosphor toward the photo-cathode 15 and to minimize the amount of light fed back to the photocathode 5.

Each electron striking the phosphor 14 produces a certain amount of light which passes through the glass substrate to the photoemissive material of the photocathode 15 causing the emission of electrons from this material. The number of electrons emitted by the photocathode 15 for each electron striking the phosphor 14 depends upon the kinetic energy of the incident electron. It is therefore desirable that the electrons emitted by photocathode 5 be accelerated to the highest velocity that is practical before they strike the intensifier element 10. This requires a high voltage from voltage supply 11. A potential of 10,000 volts produces an electron multiplication of about 10:1 while a potential of 30,000 volts, which is about the maximum at the present state of the art, raises this ratio to approximately 75:1.

The electrons emitted by element 10 and forming an intensified electron image are accelerated axially toward the target plate 17 by accelerating electrode 18 and screen 19 of very fine wire, the electrode and screen being maintained at increasingly positive potentials relative to element 10 for this purpose by means of voltage source 20 and potential divider 21. Starting with screen 19, the pickup tube is identical to the standard image orthicon television camera tube the construction and operation of which are well known in the art and described in the literature, for instance, in an article entitled "The Image Orthicon" by Rose, Weimer and Law appearing in the July 1946 issue of the Proceedings of the Institute of Radio Engineers. The RCA type 5826 is a typical image orthicon. Target 17 in its simplest form may be an extremely thin plate of low resistivity glass. The thinness and resistivity of the glass are such that electric charges are readily conducted between faces but do not spread laterally except at a very slow rate. The electrons emitted by intensifier element 10 pass through the screen 17 and strike the target plate with sufficient velocity to drive out four or five secondary electrons for each primary electron, this velocity being achieved with a source 20 potential of from 300 to 600 volts. The secondary electrons are collected by screen 19 so that the target plate acquires a positive charge that varies over its area in conformity to the variation in electron density in the electron image.

The opposite side of target plate 17 is scanned by a low velocity beam of electrons 22. This beam is generated by an electron gun consisting of a cathode 23, a beam intensity control grid 24 and a positive accelerating electrode 25 having a potential relative to the cathode of, for example, +300 volts. The relatively high initial velocity of the beam is reduced to substantially zero when the electrons reach the target plate by the decelerating field produced by low potential decelerating electrode 26. At the target plate sufficient electrons are removed from the beam to neutralize the positive charge at that point on the plate and the remainder return toward the electron gun along substantially the same path as the scanning beam under the influence of the electric field produced partly by the positive electrode 25. The returning electrons 27 strike electrode 25, which also serves as the first dynode of an electron multiplier 28, and the resulting secondary electrons 29 enter the multiplier where further augmentation of the return current through electron multiplication takes place. An amplification of about 500 times is obtained in this way, the amplified output current flowing through load resistor 30. Direct current source 31 supplies electrode 25 and the remainder of electron multiplier 28 with positive potential.

The beam 22 is caused to scan over the surface of target plate 17 in accordance with a predetermined pattern such as the pattern of a plurality of fine closely spaced horizontal lines as used in television. This pattern is produced by supplying a linear sawtooth of current of line frequency and a linear sawtooth of current of frame frequency to the horizontal and vertical deflection coils, respectively, that make up the magnitude deflection yoke generally indicated by reference numeral 32. These currents are generated by the vertical and horizontal deflection circuits 33 in accordance with standard practice.

As the beam 22 scans over the surface of the target plate the return current 27 is modulated in accordance with the variation of positive charge on the target plate. This is an inverse modulation in that the greater the positive charge on any elemental area of the target plate the smaller will be the return current when the beam scans that area. The modulation of the return current constitutes the video signal. After amplification in electron multiplier 28 this modulation is separated from the direct current component of the multiplier output by condenser 34 and applied to the input of video amplifier 3. After amplification in the video amplifier, the video signal is applied to control electrode 35 of cathode ray tube reproducer 4 to modulate the intensity of the electron beam which is caused to scan the fluorescent screen 36 in step with the scanning of the beam 22 of the image converter tube. This may be accomplished by obtaining the sawtooth currents for the horizontal and vertical deflection coils of magnetic deflection yoke 37 from the deflection circuits 33, supplying yoke 32, or by any other suitable method of synchronizing the sweeps of the two tubes. A phase reversal of the video signal may be effected in video amplifier 3 so that a positive image is formed on the screen of tube 4. Additional reproducer tubes fed with the same video signal may be used if desired to permit viewing at different locations or by a plurality of observers. Also the reproducer tube or tubes may be remotely located to permit a scene to be viewed from a point at which it would be impractical to put an observer. If necessary, a radio link may be used to transmit the video signal to the observation point in accordance with standard television practice.

The amplifier 3 may follow conventional video amplifier design as dictated by gain and bandwidth requirements. In order to provide for varying the gain of this amplifier one or more variable-mu tubes may be included with an adjustable potentiometer 38 for varying the bias applied to their control grids.

In a standard image orthicon camera tube the limit of sensitivity is reached when the variations in the positive charge on the target plate become so small as to be indistinguishable in the output from the inherent fluctuation in the scanning beam. The use of intensifier stage 10 greatly reduces the optical image brightness required to insure that the video signal obtained by scanning the target plate exceeds the fluctuations of the scanning beam. The reduction in required brightness achieved by one intensifier stage is usually sufficient to transfer the sensitivity limitation from the scanning beam to the dark current of the photocathode 5. If not, two or more cascaded intensifier stages may be used to achieve this result. The dark current of the photocathode is constituted by the electrons emitted by the photocathode in the absence of incident light. Among the causes of dark current are thermionic emission, emission due to bombardment of the photocathode by positive ions, emission by phosphorescence, feedback of stray light, etc. Since the dark current is not constant over the surface of the photocathode, it results in an output signal and imposes a limit on the sensitivity of the light amplifier that occurs at the optical image brightness for which the video signal due to variations in the brightness of the elemental areas of the image is lost in the signal due to the dark current. For high sensitivity a low value of dark current is therefore necessary. One way of minimizing the dark current is to locate the photocathode as far as possible from any source of heat. This has been done in Fig. 1 in which the photocathode 5 is located as far as possible from the thermionic cathode 23. With this precaution and with conventional large aperture optical systems scene brightnesses as low as $10^{-8}$ footlamberts may be reached before the dark current imposes a limit.

Further improvement can be obtained by directly cooling the protocathode. One method of doing this is shown in Fig. 3. The photocathode 5 has embedded therein a mesh of wire sufficiently fine to be below the resolution of the tube. This wire may be supported by a frame 39 having a stem 40 extending through and forming a seal with the glass envelope 6 of the tube. The stem then extends into a container 41 of a low temperature coolant such as liquid nitrogen. In this way heat is conducted from the photocathode material through the wires to frame 39 and thence through stem 40 to the coolant. A suitable seal under these conditions may be obtained between the Fe-Ni-Co alloy known as Kovar and 7052 Corning glass. When cooling the photocathode to this extent it may be desirable to reduce the heat coming from the cathode 23. This may be accomplished by replacing the thermionic cathode with a photocathode, a possible arrangement being shown in Fig. 4. The photocathode 23' has the output of a high intensity light source 42 concentrated on it as by reflectors formed on the under side of electrode 25. This method generates less heat than a thermionic cathode and has the further advantage of a narrower range of velocities of the emitted electrons.

Using the above methods to reduce the dark current of the photocathode, an optical system of very high light gathering ability such as a Schmidt mirror system, and a photocathode of high quantum efficiency, i.e., high efficiency in converting light quanta or photons into electrons, it is possible to reach a degree of sensitivity at which most of the signal observed on the screen of the cathode ray reproducer is due to the fluctuations in the light itself as explained by the quantum theory of light. This condition imposes the ultimate limit on the sensitivity of a light amplifier.

I claim:

1. A highly sensitive light amplifier for reproducing very low light level scenes with sufficient brightness and contrast observation, comprising: an optical system of high light gathering ability for forming an optical image of said scene; a pickup tube comprising in an evacuated envelope a photocathode for receiving said optical image and converting it into an electron image, an electron image intensifier for receiving said electron image and producing a corresponding amplified electron image therefrom, a target plate for receiving said amplified electron image and producing a corresponding positive charge pattern therefrom, means for scanning said target plate with a beam of low velocity electrons for neutralizing the positive charge thereon, and electron multiplier means for collecting the electrons from said beam in excess of those required to neutralize said positive charges and producing an output current that is an amplified replica of the current constituted by said excess electrons; a video amplifier; direct current blocking means for coupling the output of said electron multiplier to the input of said video amplifier; and a reproducer synchronized with said scanning means for converting the output of said video amplifier into a visual image; and in which said photocathode comprises a photoemissive substance having a fine wire screen embedded therein, said screen being attached to a surrounding metal frame having a metal extension extending through said envelope, and cooling means outside said envelope and acting on said extension for cooling said photocathode to a very low temperature through removal of heat therefrom via said screen, frame and extension for the purpose of reducing thermionic emission from said photocathode.

2. Apparatus as claimed in claim 1 in which the electrons of said scanning beam are derived from a second photocathode illuminated from a source of light situated outside said envelope.

References Cited in the file of this patent
UNITED STATES PATENTS

| | | |
|---|---|---|
| 2,124,224 | Batchelor | July 19, 1938 |
| 2,739,258 | Sheldon | Mar. 20, 1956 |
| 2,747,131 | Sheldon | May 22, 1956 |
| 2,845,558 | Stec | July 29, 1958 |